United States Patent
Tanase et al.

(10) Patent No.: US 12,299,496 B1
(45) Date of Patent: May 13, 2025

(54) BULK LOADER SCALING

(71) Applicant: Amazon Technologies, Inc., Seattle, WA (US)

(72) Inventors: Ilie Gabriel Tanase, Round Rock, TX (US); Serkan Turgut, Seattle, WA (US); Yejin Yoon, Seattle, WA (US); Deep Saxena, Bellevue, WA (US); Guangqiang Li, Fremont, CA (US); Utkarsh Raj, Seattle, WA (US); Karthik Rajan, Vancouver (CA); Sainath Chowdary Mallidi, Redmond, WA (US); Sudhanshu Gupta, Seattle, WA (US); Ankesh Khandelwal, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 554 days.

(21) Appl. No.: 17/677,904

(22) Filed: Feb. 22, 2022

(51) Int. Cl.
*G06F 9/50* (2006.01)
*G06F 16/901* (2019.01)

(52) U.S. Cl.
CPC ........ *G06F 9/5061* (2013.01); *G06F 16/9024* (2019.01)

(58) Field of Classification Search
CPC ............................ G06F 9/5061; G06F 16/9024
See application file for complete search history.

(56) References Cited

U.S. PATENT DOCUMENTS

| | | |
|---|---|---|
| 6,505,275 B1 | 1/2003 | Weissman et al. |
| 8,127,295 B1 | 2/2012 | Jones et al. |
| 10,157,226 B1 | 12/2018 | Costabello et al. |
| 2002/0120601 A1* | 8/2002 | Elmendorf .............. G06F 8/656 |

(Continued)

FOREIGN PATENT DOCUMENTS

| | | |
|---|---|---|
| CN | 109636139 A | 4/2019 |
| CN | 110377715 A | 10/2019 |

(Continued)

OTHER PUBLICATIONS

USPTO Final Office Action dated Oct. 16, 2023, U.S. Appl. No. 17/313,769, 32 pages.

(Continued)

*Primary Examiner* — Tuan C Dao
(74) *Attorney, Agent, or Firm* — Davis Wright Tremaine LLP

(57) ABSTRACT

Systems and methods are described for allocating computing resources to load data into a database. In some aspects, a database service obtains a request to load a number of data chunks. Responsive to the request, the database service scales a number of worker threads to load the data chunks. The scaling may include selecting a maximum number of worker threads to load (e.g., concurrently) the data chunks based on a number of data chunks, and assigning individual worker threads to load individual data chunks. The scaling may additionally include tracking a number of available worker threads relative to the maximum number of worker threads to reassign a first worker thread to load another data (Continued)

chunk upon the completing loading a prior data chunk, or assign a new worker thread that has become available based on a change in the maximum number of worker threads.

20 Claims, 8 Drawing Sheets

(56) References Cited

U.S. PATENT DOCUMENTS

| | | | |
|---|---|---|---|
| 2004/0068503 A1* | 4/2004 | Peckham | G06F 16/2246 |
| 2005/0097561 A1* | 5/2005 | Schumacher | G06F 8/10 |
| | | | 712/213 |
| 2006/0230207 A1* | 10/2006 | Finkler | G06F 12/0815 |
| | | | 710/240 |
| 2009/0089658 A1* | 4/2009 | Chiu | G06F 40/205 |
| | | | 715/234 |
| 2012/0078891 A1 | 3/2012 | Brown et al. | |
| 2013/0339395 A1* | 12/2013 | Sewall | G06F 9/5005 |
| | | | 707/797 |
| 2014/0035922 A1* | 2/2014 | Watt | G06T 19/20 |
| | | | 345/440 |
| 2015/0205590 A1* | 7/2015 | Sabne | G06F 8/456 |
| | | | 717/149 |
| 2015/0268963 A1* | 9/2015 | Etsion | G06F 9/4881 |
| | | | 712/225 |
| 2016/0358098 A1 | 12/2016 | Duesterwald et al. | |
| 2017/0329870 A1 | 11/2017 | Lindsley | |
| 2018/0007055 A1 | 1/2018 | Infante-Lopez et al. | |
| 2018/0052884 A1 | 2/2018 | Kale et al. | |
| 2018/0130019 A1 | 5/2018 | Kolb et al. | |
| 2018/0158034 A1* | 6/2018 | Hunt | G06Q 20/00 |
| 2018/0210966 A1 | 7/2018 | Bedi et al. | |
| 2018/0329958 A1* | 11/2018 | Choudhury | G06F 16/2456 |
| 2019/0042988 A1 | 2/2019 | Brown et al. | |
| 2019/0317994 A1 | 10/2019 | Singh et al. | |
| 2020/0226124 A1* | 7/2020 | Chishti | G06F 16/9024 |
| 2020/0226156 A1 | 7/2020 | Borra et al. | |
| 2020/0242642 A1 | 7/2020 | Thimsen et al. | |
| 2020/0250562 A1 | 8/2020 | Bly | |
| 2021/0081836 A1 | 3/2021 | Polleri et al. | |
| 2021/0295822 A1 | 9/2021 | Tomkins et al. | |
| 2021/0406779 A1 | 12/2021 | Hu et al. | |
| 2022/0155992 A1 | 5/2022 | Nortman | |
| 2022/0179910 A1 | 6/2022 | Bharathy et al. | |
| 2023/0316128 A1 | 10/2023 | Hodos et al. | |

FOREIGN PATENT DOCUMENTS

| | | |
|---|---|---|
| CN | 111373366 A | 7/2020 |
| WO | 2018081633 A1 | 5/2018 |

OTHER PUBLICATIONS

USPTO Non-Final Office Action dated May 9, 2024, U.S. Appl. No. 17/548,348, 6 pages.

European Patent Office Extended Search Report dated Jun. 21, 2024, Application No. 20964530.8, 8 pages.

USPTO Non-Final Office Action date May 9, 2024, U.S. Appl. No. 17/548,348, 6 pages.

International Search Report and Written Opinion mailed Sep. 9, 2021, International Patent Application No. PCT/CN2020/134603, filed Dec. 8, 2020.

USPTO Non-Final Office Action dated Apr. 18, 2023, U.S. Appl. No. 17/313,769, 22 pages.

USPTO Non-Final Office Action dated Feb. 7, 2024, U.S. Appl. No. 17/313,769, 63 pages.

Dayarathna et al., "Towards Scalable Distributed Graph Database Engine for Hybrid Clouds," 5th International Workshop on Data-Intensive Computing in the Clouds, 2014, 8 pages.

USPTO Non-Final Office Action dated Oct. 9, 2024, U.S. Appl. No. 17/548,348, 13 pages.

* cited by examiner

BULK LOADER SCALING

BACKGROUND

A graph database stores data in a graph data structure, referred to as a graph dataset, and executes queries against that graph dataset. Data that is connected or has various relationships between different portions of the data is typically stored in graph databases, where the data is represented by nodes or data points, and edges, which connect various nodes and define relationships between the different data appoints or nodes. Graph databases are designed for this type of data and allow more efficient searching or queries against the data. A standard graph query language may be used to instruct the graph database with respect to which information a user would like to select and return in query results. For example, developers build applications that rely on graph queries to gain insights into graph datasets. Unfortunately, the performance of a graph database suffers as more information is stored by the graph database. Graph databases, and other databases that house large volumes of information, may have sporadic or bursty traffic in the form of loading data into the graph database in the first place or queries submitted to the graph database. As a result, loading large amounts of data and performing queries can require a large amount of resources to process during the high traffic times, but otherwise may not need the large amount of resources to process normal operations in loading data and queries. With the resource intensive operations of graph and other databases, it can difficult, unfeasible, and inefficient to provision enough resources to handle the high bursts of traffic and have those resources committed to these operations full time.

BRIEF DESCRIPTION OF THE DRAWINGS

Various techniques will be described with reference to the drawings, in which.

DETAILED DESCRIPTION

Figure 1:
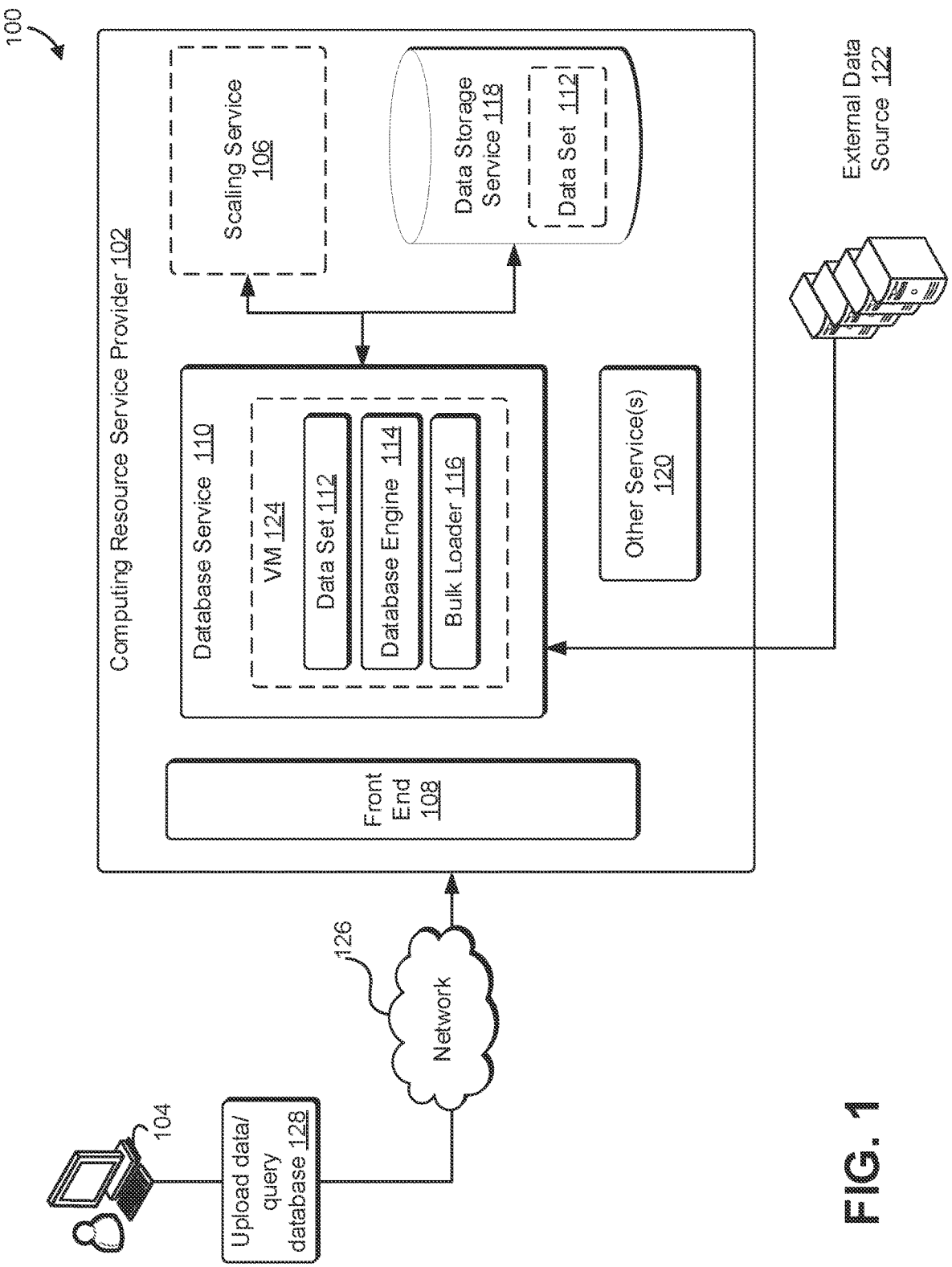
FIG. 1 illustrates an example environment in which the described techniques can be practiced, according to at least one embodiment.

Systems and methods are described herein for dynamically scaling resources to process and load data into databases, such as graph databases. In some aspects, the amount of computing resources provisioned for loading data into a graph database may be dynamically scaled, by a bulk loader system, to adapt to different loads placed on the system, such as different amounts of data and/or complexity of that data to be input into a graph database, which may be provided by a graph database service. More specifically the number of processes or threads, referred to as worker threads, which may be individually assigned portions of data to load concurrently, may be determined and adjusted based on a number of different inputs, in order to increase efficiency of the service in allocating resources to load the data. This may be particularly beneficial when large amounts of data are to be loaded into a graph database instance, where utilizing a set number of resources to load the data may take a longer time period than desired, but provisioning a large amount of resources permanently or for a long period of time may not yield an efficient use of those resources.

In some cases, the described systems and techniques may be particularly suited to allocate and scale resources to load data into large and/or complex datasets, such as graph datasets stored in graph databases. In some aspects, a graph database system or service may be provided that organizes and processes requests to load, organize, store, and access datasets that are highly connected, such as may be organized into edges and nodes (e.g., a graph dataset). The graph database service may receive and process data to load into one or more graph datasets utilizing a number of worker threads or separate processes to load the data into a specified graph database instance. The graph database service may provision one or more virtual computing systems to process these requests and allocate the different graph datasets to different respective virtual computing systems. Each individual virtual computing system (or alternatively, a dedicated hardware computing machine), may manage its own resource usage for loading data though a bulk loader. In some cases, the described bulk loader may be beneficially implemented with a scalable and/or serverless architecture, where a service, such as a graph database service, may increase or decrease computing resources available to one or more virtual computing machines or instances based on data available to load into a graph database instance.

In one example, upon receiving a request to load data (e.g., separated into chunks of data) into a graph database instance, a bulk loader context may be configured to specify a number of worker contexts (e.g., configuration parameters to launch worker threads to load data) to be initialized for loading the data. In some cases, the number of contexts initialized may be set to the maximum available or supported by the service/current resource allocation, to decrease time taken to load the data. In some cases, the bulk loader may set the number of concurrently worker contexts, or contexts that can be utilized at the same or an overlapping time, to the maximum, without affecting the underlying resource allocation to the database instance/virtual machine. A number of worker threads may be determined to load the data (based on the maximum number of worker contexts specified in the bulk loader context/array), for example, based on the size/amount of the data to be loaded. In some cases, if the data to be loaded is greater than a certain size, the maximum number of worker threads for loading the data concurrently may be increased. In some aspects, apart from a maximum number of worker threads available for a given loading job, a number of available worker threads remaining out of the maximum number of workers may also be tracked and updated throughout performance of the loading job. The number of available threads may be used to more accurately track current loading operations in progress, to reassign worker threads that have completed prior jobs, and assign new worker threads that become available in response to additional resources being added due to scaling events or additional resource allocations. Using the number of available threads, worker contexts may be assigned to worker threads, and associated with various data or statements to be loaded into a graph database instance.

In some cases, the number of worker threads (e.g., the maximum number or worker threads operating concurrently) may be increased or decreased one or multiple times throughout performance of a loading job, based on various factors, such as the remaining amount of data to be loaded, estimated time to completion based on historical performance, and so on. In some cases, the number of worker threads may be decreased upon determining that no more data is left to load for a given job or that the amount of remaining data is below a threshold value. In these and other scaling events, the number of remaining or available worker threads may be updated, to more accurately account for and assign resources to data for loading.

In some examples, either in combination with tracking the number of currently available worker threads or independently of that implementation, the described bulk loader may set or determine the maximum amount of resources to be utilized to load data into a graph database instance based on various factors or metrics. In one example, the maximum amount of computing resources may be set based on a maximum amount of resources assigned to a given graph database instance, which may be determined based on limits set for an account associated with the graph database instance. In other cases, the maximum available resources for the bulk loader may be set to satisfy a minimum amount of resources guaranteed to the account associated with the graph database instance. In either of these scenarios, in some cases, the maximum amount of resources available to the bulk loader may be adjusted based on pending or predicted queries that will be processed against the graph database instance. In some cases, accounting for resources needed to perform operations on the graph database instance (e.g., reserving or subtracting resources from the maximum available resources) concurrently with loading operations may be implemented via a permit system. In this scenario, a permit may specify a predicted amount of resources for a given operation or set of operations to be performed on a graph database instance, to aid in affecting scaling decisions for the bulk loader, without causing other operations to fail due to lack of sufficient resources.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) a reduction in time for loading data into a database, such as a graph database; (2) more efficient utilization of computing resources to load large datasets; and (3) other advantages as will be made apparent in the rest of this disclosure.

FIG. 1 illustrates an example environment 100 in which a bulk loader 116, such as may be part of or operate in conjunction with a database service 110, may be provided by a computing resource service provider 102. A client 104 may interact with the computing resource service provider 102 via a front end 108 of computing resource service provider 102 over one or more networks 126 to interact with various data and services, such as through one or more of a database service 110, a virtual machine or compute instance 124, a scaling service 106, a data storage service 118, and/or other services 120, as will be described in greater detail below.

Client 104 may refer to a client computer system or computing device connected to a server (e.g., computing resource service provider) over a network 126. In some cases, client 104 refers to a user or operator of a client computer system and may be an employee of an organization that utilizes a computing resource service provider 102 to interact with various forms of data, such as one or more datasets 112, which may be managed and/or stored by one or more of a database service 110 and a data storage service 118.

Client 104 may submit a request 128 for access to various computing resources (e.g., services or computing resources thereof) of computing resource service provider 102. The request 128, in some examples, is a web service application programming interface request (also referred to simply as a web service request), may be received by a service of the computing resource service provider 102. As illustrated, the client 104 may submit a request 128 to upload data, configure, access, query, and otherwise interact with a one or more datasets 112, as may be managed and stored by a database service 110 and/or a data storage service 118. In some cases, the request 128 may be directed to one or more services provided by the computing resource service provider 102, and may include a request to load data (e.g., as a data set 112 or part of a data set 112), or query or locate certain within a data set 112, which may be a graph data set or other collection of data that has interconnections between various points or value in the data (e.g., in an edge and node structure). In yet other cases, the request 128 may include a request to upload or establish a data set 112, manage storage conditions or parameters of the data set 112, and various other operations as would typically be performed on data.

In some examples, request 128 may include one or more of: actual data to be loaded into an existing or form a new data set 112, one or more pointers or other identifiers of a location of data to be loaded into a data set 112, various parameters as to how the data should be loaded (e.g., into a single data set 112 or multiple data sets 112 such as may form one or more database instances or graph database instances), minimum or maximum resource allocations for loading the data, other quality of service (QOS) requirements, and so on. In some cases, the request 128 may include parameters to establish a data set 112 and/or load the data set 112 into the database service 110. These parameters may include one or more identifiers or pointers of where the data set is being imported from, such as from an external data source 122 and/or a different data storage service 118, which may also be provided by the computing resource service provider.

In some cases, the front end 108 may receive the request and direct it to the appropriate service. The front end 108 may be a system including a set of web servers (e.g., a single web server or a set of web servers which may be managed by a load balancer) provided by the computing resource service provider 102. Web servers of the front end 108 may be configured to receive various requests and to process them according to one or more policies associated with the service. In at least one embodiment, client 104 uses client software that is configured to establish a client-server relationship with a service of a computing resource service provider 102. A client 104 may connect to a service via front end 108, which receives requests from clients and routes them to backend services. Front end 108 may interface with one or more of a database service 110, a scaling service 106, a data storage service 118, and/or other service 120 offered by a computing resource service provider 102 to its customers. In at least one embodiment, client 104 interacts with a GUI to interact with various media provided by or through the computing resource service provider 102, and client-side software translates the GUI setup to a web service API request which is transmitted from the client computer system 104 to front end 108 via a network 106.

In some cases, the network 126 includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network 126 is enabled by wired and/or wireless connections and combinations thereof. In some cases, a network may include or refer specifically to a telephone network such as a public switched telephone network or plain old telephone service (POTS).

The computing resource service provider 102 may provide various services such as data processing, data storage, software applications, security, encryption, and/or other such services. A computing resource service provider described herein may be implemented using techniques described below in reference to FIG. 8. The computing resource service provider 102 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems.

In some examples, the computing resource service provider 102 may provide one or more of a database service 110, a scaling service 106, a data storage service 118, and/or other service 120. Each of these services may provide ways for a customer to interact with various forms of data, including using the one or more services to storage and query large amounts of data.

The database service 110 may be a collection of computing resources or processes configured to organize, storage, manage, and run queries on various data sets 112. The database service 110 may be a managed service that makes it easy for users to set up, operate, and scale databases that house data sets 112 in the form of database instances (not illustrated). The database service 110 may rely on the virtualization techniques to allocate the compute and storage resources to provide a database instance. For example, the database service 110 may provision resources of one or more host devices or virtual machine (VM) or compute instances 124 to host a database instance. The database service 110 may provide resizable capacity while managing time-consuming database administration tasks. The database service 110 may provide one or more of a variety of database or query engines 114 (e.g., relational database engines such as MySQL, MariaDB, Oracle, SQL Server, PostgreSQL, etc., graph database engines, such as SPARQL for a Resource Description Framework ("RDF") graph model, Apache TinkerPop Gremlin for a Property Graph model, or a similar graph model and/or query language, and/or non-relational database engines) allowing existing code, applications, and/or tools to work seamlessly with databases provided by the database service 110. In some embodiments, the database service 110 may perform administrative tasks such as automatically backing up databases, upgrading and/or patching database software, scaling the compute resources or storage capacity associated with its database instances, etc.

Users 104 of the database service 110 may interact with the database service 110 to implement one or more databases housing one or more datasets 112, which may include the user 104 utilizing a console of a web-based application to issue one or more requests to an endpoint associated with the database service 110 indicating the user's 104 desire to launch/configure one or more databases. A data set 112 may include various collections of data, including graph data sets, as will be described in greater detail below in reference to FIG. 2. A management engine or controller (not illustrated) of the database service 110 may then, in response, perform operations to obtain compute resources (e.g., virtual machines (VMs) 124 executed by host device(s)) for the database instance(s), launch VM images (optionally having code for the database pre-installed), optionally launch or install databases on the host device(s), configure the database instances, configure security rules and/or permissions used by the databases or used for accessing the databases, etc.

Thereafter, database clients 104 may issue queries to a database instance to read/write data from/to the database. Such database client applications may be executed by electronic devices. As used herein and commonly in the field, the terms "statement," (e.g., text that indicates a command to a database, such as a SELECT statement, UPDATE statement, DELETE statement, etc.) "query," (e.g., SELECT statements or other commands to retrieve data based on specific criteria) and "request" may be used somewhat interchangeably and are to be interpreted as such unless otherwise indicated or made clear by the context of use.

The database service 110 may also include a bulk loader 116, which may be a collection of computing resources or processes for allocating computing resources (e.g., compute and memory) to load data for a database instance or VM 124, such as including one or more data sets 112. In some cases, the database service 110 may configure, host, and/or manage a number of different VMs 124 (or alternatively hardware machines without a virtualization layer) for different data sets. In these cases, each VM 124 may have its own operating system and corresponding bulk loader 116. The bulk loader 116 may implement routines and processes for allocating different computing resources available to a VM 124, to process and load data chunks (e.g., forming or adding to a data set 112), for a database instance.

In some aspects, the bulk loader 116 may implement systems and methods for scaling computing resources used to load data into a database instance, such as provided by VM 124. The bulk loader 116 may modify a bulk load context to provide for additional worker contexts (e.g., to be used concurrently by worker threads) to configure worker threads to load different portions of data or data chunks into a database instance. In some cases, the bulk loader 116 may track the number of available worker threads (e.g., that are not otherwise performing other load operations), to be able to more readily and accurately assign and reassign load workers to load additional data, thus increasing resource utilization during load operations. In some aspects, the bulk loader 116 may determine an amount of resources to allocate to loading data for a given database instance based on a number of different factors or parameters, as will be described in greater detail below.

The computing resource service provider 102 may also provide a scaling service 106, which may be a collection of computing resources or processes for allocating different resources and changing resource allocations for various VMs 124 managed by the database service 110. In some cases, the scaling service 106 may configure and provision different physical resources to provide one or more VMs 124 to the database service 110 for loading, storing and managing access to various data sets 112/databases. In some cases, the scaling service 106 may allocate various resources, such as provided by data storage service 118, and/or database service 110, to various VMs 124, for processing threads in relation to various data sets 112, including memory, CPU, and/or bandwidth resources.

In yet some cases, the scaling service 106 may provide a serverless database service 110, such that scaling of various resources for the database service 110 (e.g., different VMs 124 for different data sets 112), may be done automatically in response to changes in usage or need of the different VMs 124. In some cases, based on changes in resources provided by a scaling service 106 to a VM 124, the bulk loader 116 of that VM 124 may make corresponding adjustments to the available number of worker threads to load data for the system, to enable dynamic scaling of resources to load various amounts of data into a database instance efficiently. Examples of this process will be described in greater detail below. In some cases, the resources available to a VM 124 may not be scalable or increased, such that the bulk loader 116 may reach a maximum number of concurrent worker threads it can support. In other cases, if the bulk loader 116 determines that more worker threads/resources would be particularly useful in loading data, the bulk loader 116 may request additional resources from the scaling service 106. If the scaling service 106 has resources to divert or assign to the bulk loader 116, then the scaling service 106 may allocate those resources to the VM 124, which in turn prompt the bulk loader 116 to scale up the number of worker threads/memory to for performing bulk loading operations.

In some examples, the computing resource service provider 102 may additionally or alternatively provide data storage through a data storage service 118. In some cases, the data storage service 118 may interact with the database service 110, scaling service 106, and/or other services 120 to facilitate storing and querying data sets 112. In some cases, the database service 110 and the data storage service 118 may be different services, running on different resources, etc. In other cases, the database service 110 and the data storage service 118 may combine some or all functionality, computing resources, etc.

In some aspects, the data storage service 118 may be an on-demand data storage service, such as an object-based data storage service, and may be configured to store various forms of data. The data storage service 118 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein. In some examples, data stored in the data storage service 118, which may collectively form data sets 112, may be organized into data objects. The data storage service 118 may store numerous data objects of varying sizes. The data storage service 118 may operate as a key value store that associates data objects with identifiers of the data objects which may be used by the client 104 to retrieve or perform other operations in connection with the data sets 112 stored by the data storage service 118. Access to the object-based data storage service 118 may be through application programming interface (API) calls to the service or via an interface, such as a graphical user interface (GUI).

In some aspects, a data set 112, either stored by database service 110 or data storage service 118, may include data obtained from a specific application or service, such as virtual computing resources including virtual machines, containers, etc., data storage services, and other services or entities running within or outside of the computing resource service provider. In some cases, the data set 112 may include any of a number of different data sources and different types of data sources, such as from a Software as a Service (SaaS) application, a relational database or service, or other data source 122. In some cases, the customer, such as in a request 128, may specify the data set 112, such as via any type of an identifier, including IP address, resource name, such as may be assigned by a computing resource service provider 102 that provides the service or data source, or via other types of identifiers. In some cases, the data storage service 118 may operate as a key value store that associates data objects with identifiers of the data objects which may be used by the client 104 to retrieve or perform other operations in connection with the data objects stored by the data storage service 118. Access to the data storage service 118 may be through application programming interface (API) calls to the service, for example from either directly from client 104, or via the computing resource service provider 102. It should be appreciated that the data storage service 118 may additionally or alternatively provide non-object-based data storage, such as block data storage, table-oriented data storage, relational databases, file-based storage, and the like.

Figure 2:
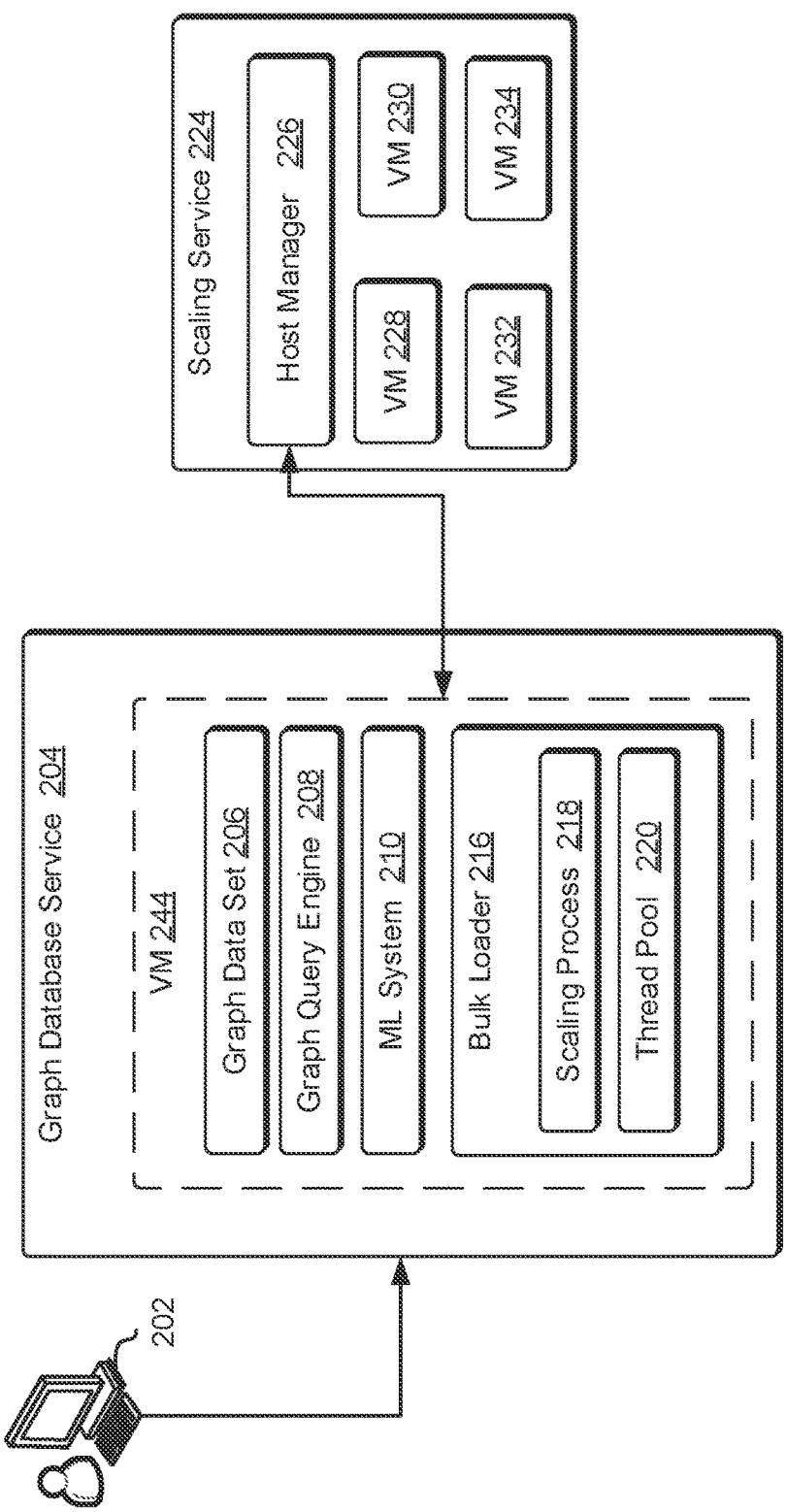
FIG. 2 illustrates an example of a graph database service, according to at least one embodiment.

FIG. 2 illustrates an example of a graph database service 204 interacting with a scaling service 224. In some aspects, graph database service 204 may include one or more aspects of database service 110 described above in reference to FIG. 1. In some examples, the scaling service 224 may include one or more aspects of scaling service 106, also described above in reference to FIG. 1. As illustrated, a graph database service 204 may provide one or more VMs or other computer system 244, which may be managed by a scaling service 224 and/or a host manager 226 thereof, for loading, storing and managing access to one or more graph data sets 206.

The graph database 204 is configured to load and store data in a graph data structure, referred to as a graph dataset 206, and execute queries against the graph dataset 206. In particular, highly connected datasets may benefit from being stored in a graph dataset. Within the graph dataset, the data is organized into nodes and edges. Each edge connects a pair of related nodes to one another and provides information about that relationship. For example, the nodes in the graph dataset may each represent a different technical paper and each of the edges may indicate that a first technical paper represented by a first node cites a second technical paper represented by a second node. Each of the nodes may have one or more properties or parameter values associated therewith. For example, each of the nodes representing a different technical paper may be associated with parameter values storing data related to the technical papers. By way of non-limiting examples, such nodes may each be associated with parameter values representing author(s), topic(s), publication date, journal name, title, and the like. Further, the edges may include multiple sets of edges with each set representing a different type of relationship. For example, as mentioned above, a first set of the edges may represent citations amongst the papers represented by the nodes and a second set of the edges may represent a subsequent paper commenting on an earlier paper.

The graph dataset 206 may be queried using a standard query language, such as SPARQL for a Resource Description Framework ("RDF") graph model, Apache TinkerPop Gremlin for a Property Graph model, or a similar graph model and/or query language. In the embodiment illustrated, the graph database 204 is configured to receive graph queries and execute them against one or more graph datasets 206 stored by the graph database 204. The graph database 204 may be configured to understand custom commands and/or parameters added to a graph query that are not part of a standard graph query language (e.g., Apache TinkerPop Gremlin, SPARQL, and the like). The custom commands and/or parameters may identify one or more machine learning models provided by a machine learning (ML) system 210, (against which the graph query is to be executed. In other words, the standard graph query language may be extended to include these additional commands and/or parameters. Alternatively, a non-standard graph query language may be used that includes these or similar commands and/or parameters. Thus, when the graph database 204 receives a graph query, the graph database 204 is configured to identify whether the graph database 204 needs to perform the graph query against the graph dataset(s) 206 or forward the graph query to the ML system 210 for processing. For example, when the graph database 204 receives the graph query, the graph database 204 reads the custom commands and/or parameters included the graph query, determines that the graph query needs to be performed by the ML system 210, formulates an invoke endpoint request that includes the graph query, and forwards the invoke endpoint request to the ML system 210.

The ML system 210 is an application or service implemented by one or more ML servers or computing systems (e.g., operating at least in part within the virtual private cloud). The ML system 210 is configured to receive the invoke endpoint request, execute an ML model using information included in the invoke endpoint request, produce an output graph dataset, perform the graph query against the output graph dataset to obtain a query result, and forward an invoke endpoint response with the query result to the graph database 204. By way of non-limiting examples, the ML system 210 may be used to perform one or more of the following tasks:

Classify one or more nodes (e.g., predict whether a particular node is fraud or not);
Classify one or more edges (e.g., predict one or more labels for a particular edge);
Predict an edge;
Find one or more target nodes (e.g., predict a target node for a particular source node and set of edge labels);
Find one or more source nodes; and
Find one or more edge labels (e.g., predict an edge label for an edge connecting a source node and a target node).

Further, the ML system 210 may be configured to build, train, and deploy various ML models.

The graph database 204 may receive the invoke endpoint response with the query result, formulate a query response, and forward the query response to the entity that sent the graph query to the graph database 204. In alternate embodiments, the graph database 204 may forward the query response to the automated process when the automated process sent the graph query to the graph database 204. Additional details concerning using ML models to enhance graph database functionality are found in U.S. patent application Ser. No. 17/313,769, titled USING GRAPH QUERIES TO OBTAIN RESULTS FROM MACHINE LEARNING MODELS, filed May 6, 2021, the contents of which are herein incorporated by reference in their entirety.

As also illustrated in FIG. 2, the graph database service 204 may also include a bulk loader 216, which may include a scaling process 218 and a pool or group of loader or worker threads 220. In some aspects, bulk loader 216 may include one or more aspects of bulk loader 116 described above in reference to FIG. 2. The loader thread pool 220 may be any storage resource managed or available to graph database service 204/VM 244, which may store and process various threads for the operating system of the VM 244/graph database service 204. Each thread may be a task or process to be executed by VM 244/graph database service 204, including operations to be performed on one or more graph data sets 206. As described herein, the threads may be worker or loader threads, that when executed load data chunks into graph data set 206, format or perform other tasks on or relative to data to be loaded to a graph dataset 206, perform other tasks relating to establishing or configuring the graph dataset 206, such as defining edges, nodes, and other parameters of the graph data set 206, and so on.

In some aspects, the bulk loader 216 may also include a scaling process 218, which may modify a number of threads maintained in the loader thread pool 220 based on a variety of factors, to ultimately increase resource efficiency in loading data into a graph data set 206. The scaling process 218 may interface with scaling service 224 to determine and allocate resources for loading data into graph data set 206. In some cases, the scaling service 218 may determine a number of threads needed to load data into graph data set 206. In some cases this number may be informed by a maximum amount of computing resources allocated to an account associated with the graph data set 206/graph database instance, a minimum amount of computing resources allocated to an account associated with the graph data set 206/graph database instance, and/or based on other factors. In some cases, the scaling process 218 may modify this number based on other computing requirements placed or to be placed on the VM 244/graph database instance. In some cases, the scaling process 218 may make this determination once, or multiple times through a loading job, such as based on current progress of loading the data, remaining data to load, and other factors.

Once the scaling process 218 has determined the number of threads needed, the scaling process 218 may communicate with the scaling service 224 to provide the resources. In some cases, the scaling process 218/bulk loader 216 itself may determine an amount of computing resources, which may include compute resources (e.g., processing power or capability) and memory (e.g., to support one or more queues for temporarily storing data that is to be loaded), that are needed for the specified number of threads. In other cases, the scaling service 224 may make this determination. Similarly, when less resources are needed, such as when the amount of remaining data drops below a threshold, and for example, there are no future jobs pending, the scaling process 218 may communicate with the scaling service 224 to decrease the amount of computing resources allocated/reserved to the VM 244. In some cases, the scaling process 218 may dynamically change or re-determine the amount of resources needed for loading the data, such as based on a time interval (e.g., on the scale of every minute, 5 minutes, 30 minutes, an hour, 12 hours, a day, etc.), or upon the occurrence of triggering event (e.g., remaining data to load reaches a number relative to an upper or lower threshold value, etc.), or based on other factors or inputs to the system.

Through this process of scaling resources for loading data, the scaling process 218 may track a maximum number of threads that are allocated to bulk loader 216 for loading data. In some cases, the scaling process 218 may also track a number of available threads that are maintained in the thread pool 220 that are available to load additional data into data set 206. In some cases, the scaling process may utilize the number of available threads in the thread pool 220 to make scaling decision, rather than the maximum number of threads allocated in the pool 220. This may yield a more efficient utilization of resources for loading data and may more quickly adapt to changes in various factors affecting data loading speed and accuracy. These factors may include additional data be indicated for loading, calculating estimated completion time and comparing this to QoS requirements of a particular loading job and changing resource allocation to meet the QoS parameter, or based on various other factors that relate to the data itself (complexity of data or amount relationship between the data), loading speed form various data sources, and so on.

In some cases, the scaling process 218 may first request computing resources from the VM 224 itself to scale the worker thread number up to meet requirements of a loading job. In these scenarios, the scaling process 218 may request additional resources form the scaling service 224 upon using all available resources of the VM 224. In other cases, the scaling process 218 may request resources from the scaling service 224 first.

In some cases, the bulk loader 216/scaling process 218 may determine a number of threads for the graph database service 204, or on a more granular scale for an individual graph data set 206 or VM 244. In some cases, the scaling process 218 may determine or modify the amount of data allocated to each thread for loading, to optimize thread turnaround time (e.g., time to complete a specific data loading task). For example, a larger amount of data may be allocated to a given thread based on the amount of computing resources allocated to the individual thread, the consistency by which the data is organized and may be loaded at a constant or relatively constant rate, and so on.

In some cases, the bulk loader 216/scaling process 218 may set a resource number for individual threads or groups of threads, such as based on one or more characteristics of the threads. In some cases, this may include setting resources at a specific value based on the type of thread, complexity of the thread (e.g., how many individual tasks are contained in the thread, how complex a loading operation is, whether or not ML processing is needed to process the thread, etc.), size of the graph data set 206 (e.g., based on a determination of how much memory will be needed to process the thread based on a size of the graph data set), other characteristics of the graph data set 206, variable or parameter associated with processing the thread (e.g., time of day, relative load of the system, number of threads waiting in the thread pool), and so on. One or more of these parameters may be used and/or combined to form ranges of the number/max number of threads allocated to the bulk loader 216. In some cases, a certain number of threads may be automatically selected by the bulk loader 216 based on one or more of these parameters to efficiently allocate computing resources to the threads.

The VM 224 may also execute other threads as well. Examples of these threads may include queries to be performed against the graph data set 206, tasks relating to training one or more ML models to be used for modifying and/or querying a graph data set 206, and various other operations as are typically performed on data sets stored in a database. The threads themselves may include or be associated with a request for an amount of memory needed to process the thread. In some cases, the threads themselves may have an indication of the amount of memory each needs to be processed, and in other cases, another component, such as the thread pool 218 or memory allocator 216 may determine how much memory a give thread will need to be processed.

The scaling service 224 may be a managed service and may provision and manage resources for a number of virtual computing resources, such as VMs 228-234 and 244. It should be appreciated that while VMs are primarily described in this disclosure, that other virtual and non-virtual computing resources are contemplated herein, including dedicated hardware machines, software containers that may share an operating system and/or various other computing resources, and so on. In some cases, the scaling service 224 may also include a host manager 226, which may be a set of computing resources or processes that manage changing resource allocations to one or more VMs 228-234, and 244. A host manager may be associated with an individual VM, or be shared across multiple VMs. In some cases (not illustrated), a host manager may reside within a virtual machine, such as VM 244.

The host manager 226 may obtain resource usage data of a VM 244, such as how much memory is being used by VM 244, how much CPU, how much bandwidth, and various other resources usage data. The usage data may be obtained continuously, periodically, aperiodically, or upon the occurrence of one or more triggering events. In one example, resource usage data may be obtained every second, every 30 seconds, every minute, every hour, etc. This information may be utilized by the scaling service 224 to make determinations as to whether additional resources need to be provision for a given VM to perform one or more data loading jobs. In some examples, bulk loader 216/scaling process 218 may provide this information to the host manager 226, so that the host manager 226/scaling service 224 may adjust resource allocations to VM 244. In some cases, adjusting resource allocation may include increasing one or more resources accessible to the VM 244, or may include migrating the VM to a VM having a different resource profile, to accommodate changes in traffic to (e.g., number of queries submitted) the graph database service 204. In yet other cases, adjusting the resource allocation of a VM 244 may include provisioning an additional VM to work in tandem with VM 244.

In some examples, the described system 200 may support serverless automatic scaling behavior, that is triggered based on resource usage where resource is either memory, CPU or network. For example, if the current memory usage goes above a certain threshold for a given VM 228-234, 244, then the system can be scaled up and additional memory/compute resources become available. Similarly, when memory usage goes below a certain threshold and memory/compute resources are returned from the application memory allocator to the OS, then resources are scaled down and total physical memory available to the application is reduced. The scaling service 224 may monitor memory usage by means of monitoring the native memory allocator 216 of individual systems/VMs, and scaling decisions may be made based on the amount of memory use reported by this module.

In some aspects, a different VM 244 may be provisioned for individual graph datasets 206, where one or more of components 206, 208, 210, and/or 216 may be implemented specifically for that VM 244. In other cases, graph database service 204 may implement multiple VMs 244, which may share on or more of these components.

In yet some cases, the bulk loader 216/scaling process 218 may determine and/or adjust the number of threads to be used for a loading job based on a fixed amount of resources provided by the scaling service 224 to the VM 244. In these cases, the bulk loader 216/scaling process 218 may utilize the maximum number of threads to load the data. In yet some cases, the bulk loader 216/scaling process 218 may scale the number of threads that can operate concurrently, such as through adjusting the maximum number of contexts that are available at any given point in time, to in essence make and implement scaling for data loading jobs.

Figure 3:
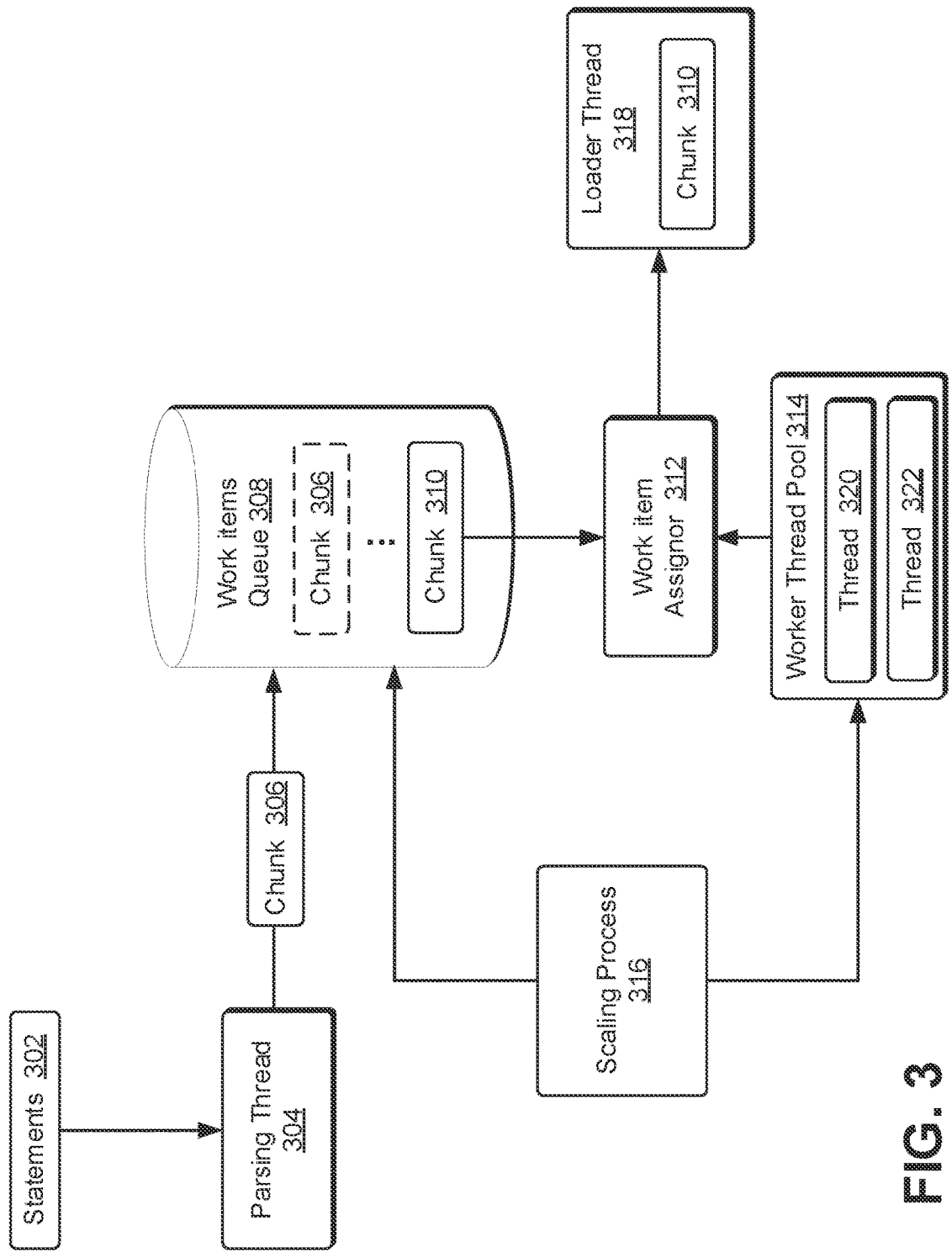
FIG. 3 illustrates an example system and process for loading data into a database, such as may be utilized by the graph database service described in reference to FIG. 2, according to at least one embodiment.

FIG. 3 illustrates an example system and process 300 for loading data into a database, such as may be utilized by the graph database service 204 described in reference to FIG. 2. In some aspects, one or more aspects of system 300 may be provided by a bulk loader, such as bulk loader 206 described above in reference to FIG. 2, such as paring thread or process 304, work item queue 308, work item assignor 312, worker thread pool 314, and/or loader thread 318.

In the example illustrated, a parsing thread 304 may receive data in any of a variety of formats, such as represented by statements 302. The parsing thread 304 may be a process, such as executed by bulk loader 206, that obtains data for loading into a database or data set, as described above in greater detail. The parsing thread 304 may obtain the data in a variety of formats and provide chunks of data 306 (e.g., that include a number of statements 302, such as 30 k materialized statements or other configurable amount of data to load) as an output to a work item or load queue 308. The queue 308 may store a number of different chunks of data that are to be loaded into a database or data set, and may maintain those chunks 306 through 310 in the order received. A work item assignor 312 may assign a worker context to an available worker thread 318 from a worker thread pool 314. As described herein, the worker thread pool 314 may be scaled, such as by a scaling process 316, which may incorporate one or more aspects of scaling process 218 described above in reference to FIG. 2.

In some cases, the scaling process 316 may control the number of concurrent threads available for loading data and/or the size of the work item queue 308 (e.g., the amount of memory allocated to the queue 308, thus determining how many chunks 306 through 310 the queue 308 can store at one time. The worker thread pool 314 may maintain a number of threads executable to load data in the form of chunks 306-310 to a database or data set, as described above. As illustrated, the work item assignor 312 may assign a worker context to a worker thread 318 and then allocate one or more chunks of data 310 to the worker thread to load.

In some aspects, a default number of load worker threads from the thread pool 314 may be set to the number of processing cores of the VM or other computing system providing the database or data set. Each load worker thread (or work items processor) uses a load worker context (ctx) to load data. This context carries state of chunk load 306-310 (whether a load is in progress) and may also carry some state over to the next chunk load processed from the queue 308 using the same context (unresolved write conflicts). The work item assignor 312 may, upon dequeuing a chunk 310, determine a next available load worker context, and spawn or select a new thread to load the chunk using that context.

Figure 4:
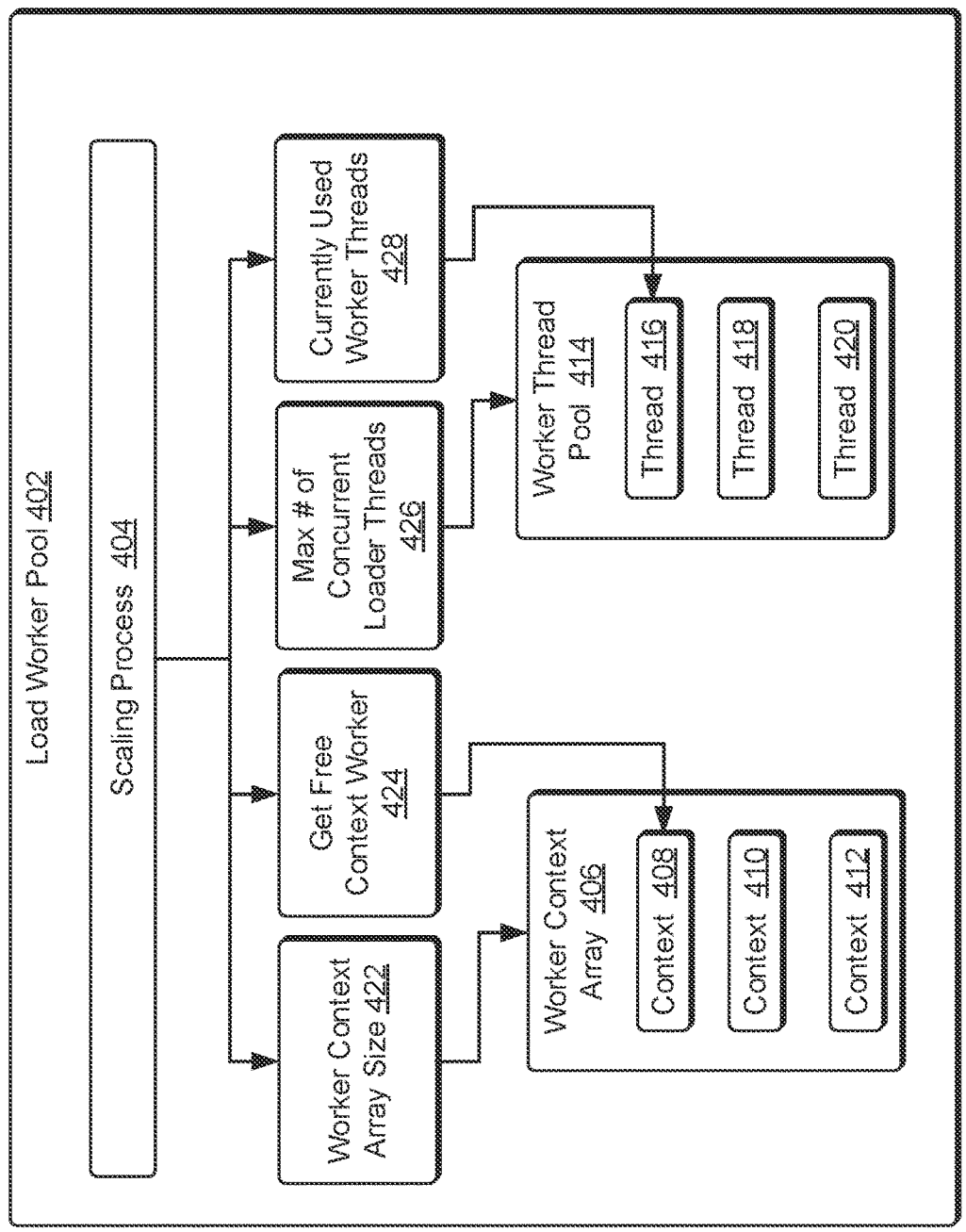
FIG. 4 illustrates an example of a bulk loader, which may be provided by a graph database service described in reference to FIG. 2, and/or utilize the system described in reference to FIG. 3, according to at least one embodiment.

FIG. 4 illustrates an example system 400 which includes a bulk loader 402 that further includes a scaling process 404 and a thread pool 414. Bulk loader 402 may include one or more aspects of bulk loader 116, 2216 described above in reference to FIGS. 1 and 2. Scaling process 404 and worker thread pool 414 may include one or more aspects of scaling process 218, 316 and/or thread pool 220, 314 described above in reference to FIGS. 2 and 3. As illustrated, the scaling process 404 may track and modify up to three different parameters, including a worker context array size 422 (e.g., that specifies the number of contexts that can be utilized at any one time or concurrently), a maximum number of loader threads 426 (e.g., that can be executed concurrently), and a number of available loader threads 428.

The worker context array size parameter 422 may indicate a number of worker contexts that are generated to control worker or loader threads for loading data. The worker context array size 422 may be defined or part of a worker context array (e.g., a bulk loader context, which may include various parameters for configuring the bulk loader itself for a given job). The number indicated in the worker context array size 422 may determine how may worker contexts 408, 410, 412 are available to be assigned to different worker threads as contained in the worker context array 406. The maximum number of loader threads 426 parameter may define an upper limit to the number of worker contexts usable to load data. In some cases, this number may by default be set at the number of processing cores available to the system or service to load data. The scaling process 404 may modify this number to affect scaling of the thread pool 414, which may include a number of threads 416, 418, 420, to dynamically adapt to various conditions or changes in conditions affecting loading data. The scaling process 404 may also track and update a number of available worker threads 428, which may indicate the number of threads that are available to be assigned to load new chunks of data. In some cases, the number of available worker threads 428 may represent the number of allocated threads subtracted from the maximum number of threads 426. The scaling process 404 may use the number of available worker threads 428 to determine if and when available threads should be assigned to new chunks of data to load.

At one or various points during performance of a loading job, the scaling process 404/bulk loader 402 may call a get free context worker function 424 to obtain a worker context, such as context 408, to assign to an available worker thread, such as any of threads 416-420, to assign a new chunk of data to load. In some cases, the scaling process 404/bulk loader 402 may determine if there are any available threads using the number of available threads value 428. If a thread is available, the get free context worker function 424 may be called, to assign the available thread a worker context to load a new chunk of data.

As described above in reference to FIG. 2, the scaling process 404 may interact with a scaling service to increase the computing resources made available to load data for a graph database. In some cases, this may prompt the scaling service to add (or subtract) processing cores allocated to a VM that instantiates the graph database instance. It should be appreciated that the scaling process 404 may adapt to various amounts of data to load, including from a few hundred statements up to multi-billion statement jobs. In some cases, the scaling service may scale or change the number of threads/underlying computing resources made available to the database service for loading data multiple time through a loading job. In yet some cases, the database service may utilize a dictionary loader that defines relationships between data that is ingested in a database instance. In these scenarios, the scaling process 404 may operate independently of the dictionary loader, such that each loader may change the number of threads used for performing their respective functions at different times and based on different metrics. This may be conceptualized as a decoupling between the bulk loader 402 and the dictionary loader. In yet some cases, the dictionary loader may be scaled differently for periods of bulk loading. This may include scaling the dictionary loader up to meet increasing demands of the bulk loader 402, or conversely, scaling the dictionary loader down to free up more resources for the bulk loader 402. In some cases, the bulk loader 402 may be scaled based on a number of cache misses or errors, such that more resources may be allocated to the bulk loader in the case of more misses or errors.

In some examples, the scaling process 404 may utilize one or a combination of scaling techniques to increase or decrease the number of threads made available to load data. In some cases, the scaling process 404 may select a scaling technique to implement based on a variety of factors, including amount of data in a given load job, a number of pending load jobs and their respective data amounts, QoS parameters of one or more loading jobs, amount of computing resources available to the database service or instance, load on the entire service in the form of utilized computing resources, and various other factors.

In one example, the scaling process 404 may utilize a static technique, whereby a given number of threads/resources are allocated to the bulk loader 402 based on the loading job size. In this technique, the number of loader threads that are provisioned may be set to a static value. If the number of processing cores/computing resources available are fewer than would support the number of threads, then the loader threads would contend on cores and operating system of the VM/database instance would manage scheduling processing cores/resources between loading threads and other processes carried out by the operating system. In some cases, this technique may add more context switches related latencies. However, the threads and the worker item queues hold chunks of materialized statements, which take up a lot of memory. In some cases, there may not be enough memory to hold the same number of chunks at all scales, so this limit would not actually be realized in practice.

In another example, the scaling process 404 may utilize a fixed scaling technique, whereby a given number of threads/resources are allocated to the bulk loader 402 and scaled up based on the loading job size. After a bulk load request is received, the following operations may be performed. First, the data to be loaded may be identified via a load identifier (any alpha numeric identifier). Next, the scaling service/host manager may be requested to scale up resources available to the bulk loader. In some cases, the request to scale up resources may be submitted asynchronously from loading the data in a separate thread or process. In some cases, starting to load the data may be delayed until the scale up in resources has started or completed. When the load is finished, if there is another queued load or data, the next load may be started. When the load finishes, and there is no remaining queued load, the host manager/scaling service may request to scale resources back down to a lower level to more efficiently utilize available resources. In some cases, this process may include asynchronously requesting the scaling service to a) scale up, if not at the desired scale already, and b) wait for scaling event notification, and c) resize the worker context array size to the scale dup number of cores available to the system.

In another example, the scaling process 404 may utilize a dynamic scaling technique, whereby a given number of threads/resources are allocated to the bulk loader 402 and scaled up or down throughout performance of the loading job. After a bulk load request is received, the following operations may be performed. First, the scaling service/host manager may be requested to scale up resources for the load job. The loading job may then be started. When the scaling service/host manager notifies the scaling process 404 of a scale up, the threads allocated to loading the data may be scaled based on the data to load. When load finishes, if there is any queued load, the next queued load may be started. When the load is finished an there are no remaining queued loads, the scaling process 404 may request the host manager/scaling service to scale down resources. In some cases, if a scale down event occurs, for example, changing a number of available threads from 8 to 4, and loader worker 7 has statements with unresolved conflicts, then the conflicts won't be retried until all chunks have loaded at least once.

In another example, the scaling process 404 may set the number of loader threads based on a minimum number of resources allocated to the database instance/account associated with the database instance. In this scenario, the scaling process 404 may ensure that the number of threads for a given loading job never goes below a minimum threshold. In some cases, this lower limit of threads for a load job may be combined with one or more of the other scaling techniques described herein, to for example, a certain QoS is met.

In yet another example, one or more of the above scaling techniques may be combined with various ways to account or reserve system resources for performing other operations with respect to a database instance. In these cases, resources may be reserved or set aside for these other operations, based on predicted and/or historical information regarding resource usage of these other operations. In some aspects, this may be implemented using a permit system, where a set number of permits are issued for a set of computing resources allocated to a database instance. A certain number of those permits may be reserved for various other functions and operations that are or may be performed on the database instance during a time period for the data loading job. In some cases, the permit system, and determining what resources should be reserved may be based on predictions of resource usage that may be informed by historical data. In some cases, the bulk loader 402 may manage resources using the permit system. In some cases, the size of the work item/data to load may be accounted for in a number of ways. In one example, the data to load (e.g., chunk) may be ingested in protobuf form and then converted to a database statement. The database statement may then be converted or compacted to optimize loader memory usage. The size may then be determined and stored by the bulk loader. In another example, the size of the work item may be registered before it is inserted into the queue.

Figure 5:
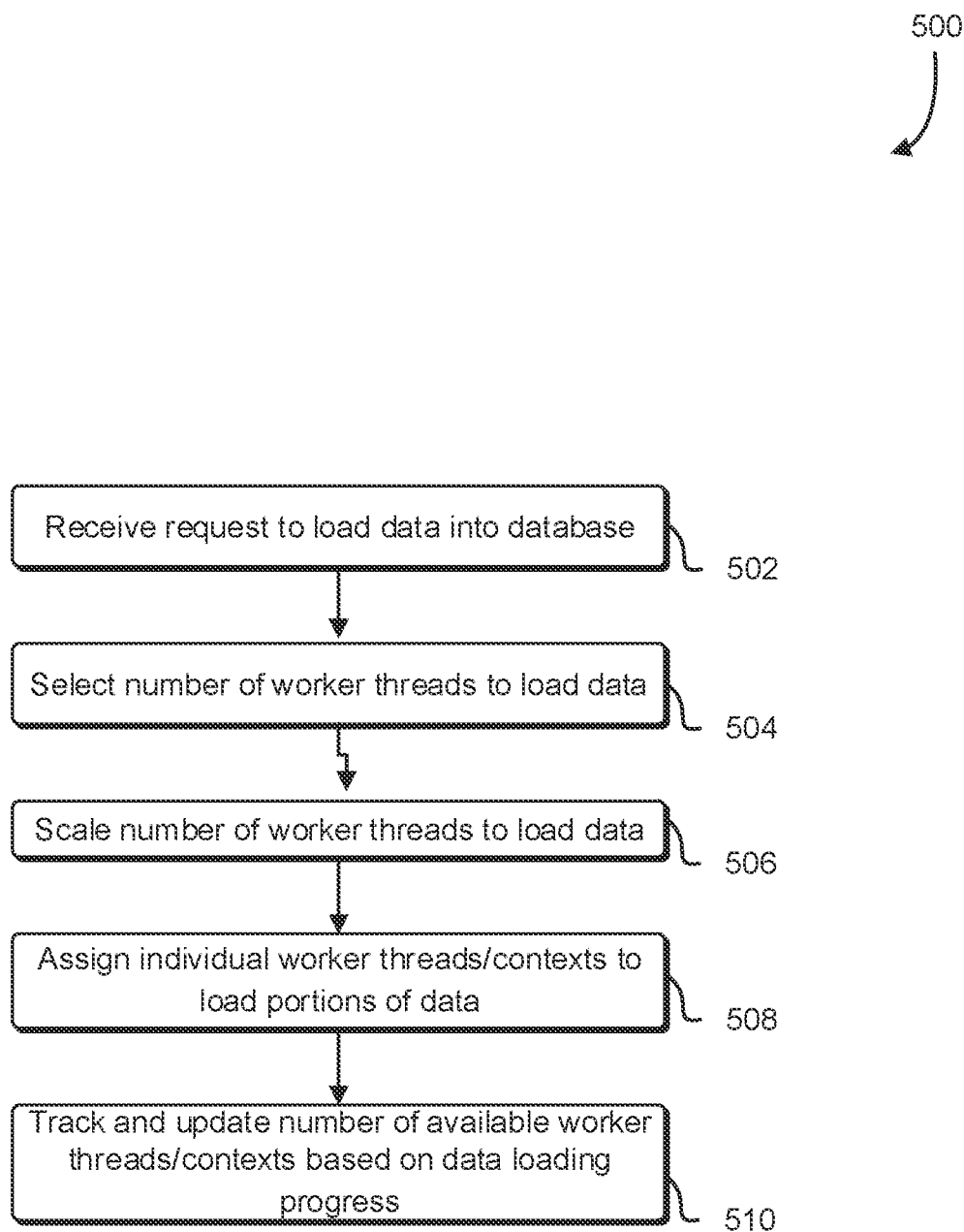
FIG. 5 illustrates an example process for dynamically scaling a bulk loader of a database, according to at least one embodiment.

FIG. 5 illustrates an example process 500 for scaling a bulk loader of a database. In some aspects, process 500 may be performed by one or more of a database service 110, a graph database service 204, a scaling service 106, 224, a VM 124, 224, or various components thereof, including a bulk loader 116, 216, scaling process 218, thread pool 220, 402 described above in reference to FIGS. 1, 2, and 3, and/or may utilize one or more aspects of system/process 300.

Process 500 may begin at operation 502, in which a request to load data into a database may be received, such as by a bulk loader. The request may indicate or identify data to be loaded or ingested into the database. The bulk loader may then, in some cases, select the number of worker threads to process and load the data into the database, at operation 504. In some cases, in response to the amount of data being above a threshold, the bulk loader may scale/increase the number of worker threads to load the data, at operation 506. In some cases, the bulk loader may utilize a maximum number of threads for a given load job as a starting point for assigning threads to different portions of the data. In some cases, the maximum number may, by default, set to the number of processing cores allocated to the database or database instance. In yet some cases, the bulk loader may increase the max thread number based on a variety of factors, as described herein.

Next, at operation 508, the bulk loader may assign individual worker threads to load portions or chunks of the data. In some cases, operation 508 may also include assigning a worker context, or configuration parameters, to the worker thread. The bulk loader may additionally track and update the number of available worker threads throughout the load job, at operation 510. In some cases, the bulk loader may utilize the number of available threads to more accurately and efficiently allocate resources for loading data, as described in more detail in other parts of this disclosure. In some cases, the bulk loader may make multiple scaling decisions, performing operations 504-510, during a load job, based on one or more loading conditions, which may relate to QoS parameters for the load job, amount of data left to be loaded, etc.

Figure 6:
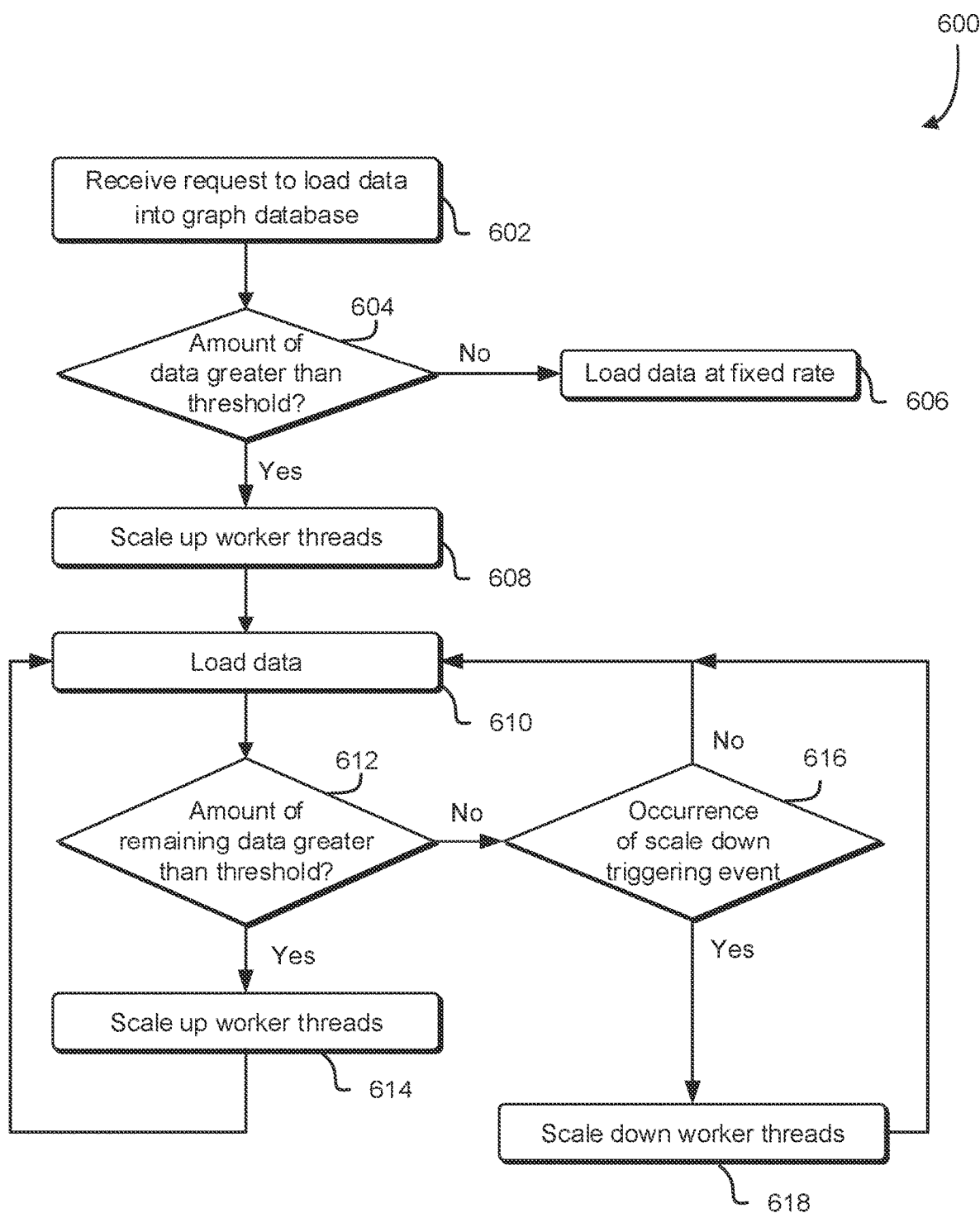
FIG. 6 illustrates an example process for dynamically scaling a bulk loader of a graph database, according to at least one embodiment.

FIG. 6 illustrates an example process 600 for scaling a bulk loader of a graph database. In some aspects, process 600 may be performed by one or more of a database service 110, a graph database service 204, a scaling service 106, 224, a VM 124, 224, or various components thereof, including a bulk loader 116, 216, scaling process 218, thread pool 220, 402 described above in reference to FIGS. 1, 2, and 3, and/or may utilize one or more aspects of system/process 300.

Process 600 may begin at operation 602, in which a request to load data into a graph database may be received, for example, by a bulk loader. Next, at operation 604, it may be determined if the amount of data to load is greater than a configurable threshold. The threshold may be determined or modified based on resources available to the bulk loader/graph database. If the amount of data is determined to not be greater than the threshold, the data may be loaded at a fixed rate/with a fixed number of threads, at operation 606. However, if the amount of data to load is greater than the threshold, the the number of worker threads may be scaled up or increased, at operation 608. Data may be loaded, according to the load job, at operation 610, by the number of load workers determined at operation 608.

Next, at operation 612, it may be determined if the amount of data remaining to load is greater than a threshold value. If the amount of remaining data is greater than the threshold, then process 600 may proceed to operation 614, in which the worker threads may be scaled up again, whereby data may be loaded using the increased number of worker threads, at operation 610. Process 600 may continue to loop through operations 610, 612, and 614, until the amount of remaining data is not greater than the threshold, as determined at operation 612. In this scenario, process 600 may proceed to operation 616, in which a determination may be made as to whether a scale down triggering event has occurred. A scale down triggering event may include no more data to be loaded, no more pending jobs after the current load job, or other events. If a scale down triggering event has not occurred, then process 600 may loop back to operation 60 and continue through the operations as described above. At a point in which the occurrence of a scale down triggering event is detected or determined, at operation 616, then the worker threads may be scaled down or decreased, at operation 618. In some cases, operation 618 may be performed once, or may be performed multiple times until all threads are released from the load job, at which point the load job reaches completion.

Figure 7:
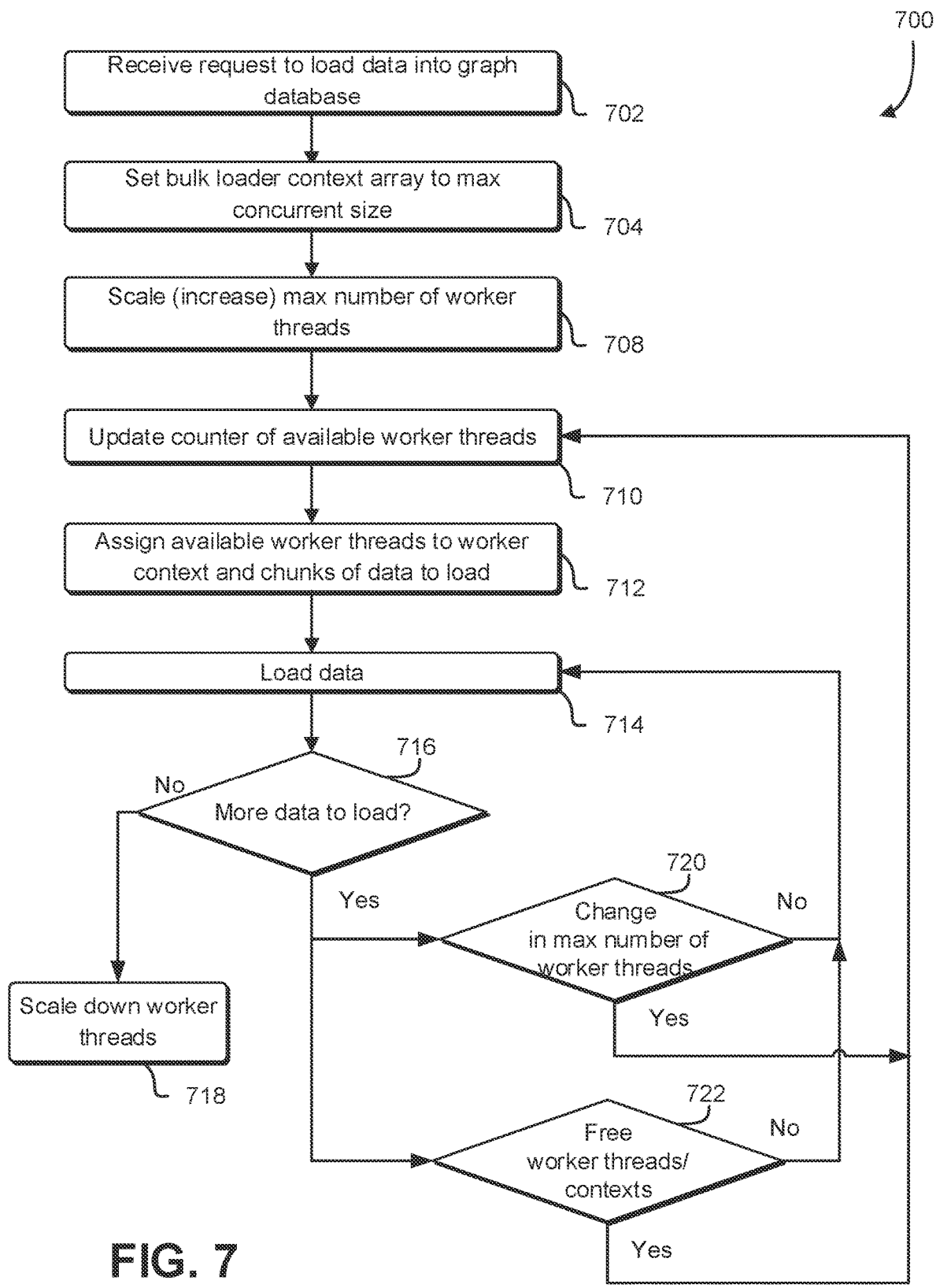
FIG. 7 illustrates another example process for dynamically scaling a bulk loader of a graph database, according to at least one embodiment.

FIG. 7 illustrates an example process 700 for dynamically scaling a bulk loader of a graph database. In some aspects, process 700 may be performed by one or more of a database service 110, a graph database service 204, a scaling service 106, 224, a VM 124, 224, or various components thereof, including a bulk loader 116, 216, scaling process 218, thread pool 220, 402 described above in reference to FIGS. 1, 2, and 3, and/or may utilize one or more aspects of system/process 300.

Process 700 may begin at operation 702, in which a request to load data into a graph database is received, such as by a bulk loader. Next, at operation 704, the bulk loader context array may be set to the maximum available size (e.g., specifying the number of contexts that can be used concurrently), as described in more detail above in reference to FIG. 4. Next, the max number of worker threads may be scaled or increased, at operation 708. A counter of available worker threads may then be updated to reflect the increase in maximum worker threads, at operation 710. Available worker threads may then be assigned a corresponding worker context and chunks of data to load, at operation 712. The worker contexts may then load the data, at operation 714.

At various points during loading the data, operation 716 may be performed, in which it may be determined if there is more data to load. If no more data is left to load, the number of worker threads may be scaled down, at operation 718. Process 700 may then loop back through operations 714, 716, and 718, until there is no more data to load, at which point process 70 may end. However, if there is more data to load, as determined at operation 716, then operations 720 and 722 may be performed. Operation 720 includes determining if there as been a change in the max number of worker threads available of the load job. If there has been no change, process 700 may loop back to operation 714 and proceed to other operations, as described in greater detail above. If there has been a change in the max number of threads, then process 700 may loop back to operation 710, in which the counter of available threads may be updated. Process 700 may proceed top operation 712 and so on, as described in greater detail above. Similarly, at operation 722, it may be determined if any free worker threads or worker contexts have become viable. If yes, process 700 loops back to operation 710. If no threads/contexts have become available, then process 70 may loop back to operation 714.

Figure 8:
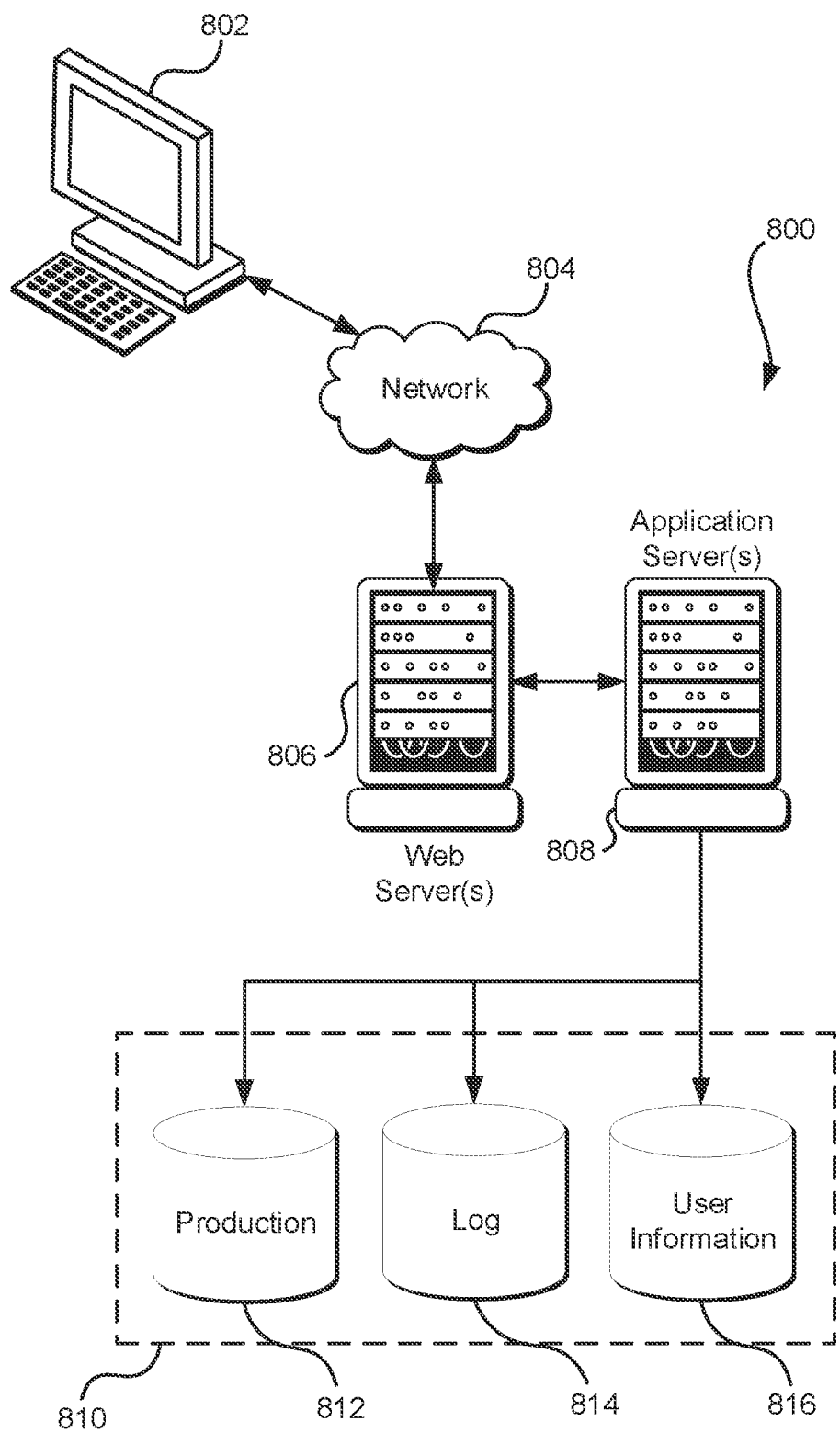
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   obtaining, by a graph database service, a request to load a plurality of data chunks into a graph database;
   responsive to obtaining the request, scaling up a number of worker threads usable concurrently by the graph database service to load the plurality of data chunks, by:
      initializing a bulk loader context to indicate a maximum available number of worker contexts usable concurrently, the worker contexts used by the worker threads to load the plurality of data chunks;
      increasing a maximum number of concurrent worker threads to load the plurality of data chunks;
      increasing a number of available worker threads available to the graph database service, wherein the number of available worker threads is increased based on increasing the maximum number of worker threads; and
      assigning worker contexts to worker threads from the maximum number of worker threads to load data chunks of the plurality of data chunks based on the number of available worker threads; and
   concurrently executing the assigned worker threads to load the data chunks into the graph database.

2. The computer-implemented method of claim 1, further comprising:
   decreasing the maximum number of worker threads for loading the plurality of data chunks based on determining that there are no more data chunks to load in the plurality of data chunks;
   updating the number of available worker threads based on the decreased maximum number of worker threads.

3. The computer-implemented method of claim 2, wherein loading a first data chunks of the plurality of data chunks causes a conflict, wherein the method further comprising:
   persisting the conflict until at least the first data chunks is loaded into the graph database.

4. The computer-implemented method of claim 1, further comprising:
   increasing the maximum number of worker threads for loading the plurality of data chunks to a second maximum number based on the loading the plurality of data chunks satisfying a loading condition;
   updating the number of available worker threads available to the graph database service based on the second maximum number; and
   assigning worker contexts to worker threads from the second maximum number of worker threads to load data chunks of the plurality of data chunks based on the updated number of available worker threads.

5. A system, comprising:
   one or more processors; and
   memory that stores computer-executable instructions that, if executed, cause the one or more processors to:
      obtain, by a database service, a request to load a plurality of data chunks into a database;
      responsive to obtaining the request, scale a number of worker threads usable by the database service to load the plurality of data chunks, by:
         select a maximum number of worker threads to load the plurality of data chunks based at least in part on a number of data chunks in the plurality of data chunks;
         assign individual worker threads of the maximum number of worker threads to load data chunks of the plurality of data chunks; and
      concurrently execute the assigned individual worker threads to load at least some of the plurality of data chunks into the database service; and
      track a number of available worker threads relative to the maximum number of worker threads to at least one of automatically reassign a first worker thread of the maximum number of worker threads to load another data chunks of the plurality of data chunks upon the first worker thread completing loading of a first data chunks of the plurality of data chunks or automatically assign a new worker thread that has become available based on a change in the maximum number of worker threads.

6. The system of claim 5, wherein the memory stores additional computer-executable instructions that, if executed, further cause the one or more processors to:
   select the maximum number of worker threads additionally based on a maximum amount of computing resources associated with the database.

7. The system of claim 5, wherein the memory stores additional computer-executable instructions that, if executed, further cause the one or more processors to:
   select the maximum number of worker threads further based on a maximum amount of computing resources assigned to the database, wherein the maximum amount of computing resources assigned to the account is adjusted based on pending or predicted queries against the database.

8. The system of claim 5, wherein the memory stores additional computer-executable instructions that, if executed, further cause the one or more processors to:

select the maximum number of worker threads additionally based on a minimum amount of computing resources assigned to the database.

9. The system of claim 5, wherein the memory stores additional computer-executable instructions that, if executed, further cause the one or more processors to:
select a second maximum number of worker threads based on a remaining number of data chunks in the plurality of data chunks; and
assign at least one worker threads from the second maximum number of worker threads to load at least one data chunk of the plurality of data chunks.

10. The system of claim 5, wherein the memory stores additional computer-executable instructions that, if executed, further cause the one or more processors to:
decrease the maximum number of worker threads usable by the database service to load the plurality of data chunks upon detecting that there are no more data chunks of the plurality of data chunks to load.

11. The system of claim 5, wherein the memory stores additional computer-executable instructions that, if executed, further cause the one or more processors to:
decrease the maximum number of worker threads usable by the database service to load the plurality of data chunks upon detecting that there are no pending requests to load additional data chunks into the database.

12. The system of claim 5, wherein scaling the number of worker threads usable by the database service to load the plurality of data chunks is performed concurrently with loading data chunks of the plurality of data chunks by initialized worker threads.

13. The system of claim 5, further comprising:
selecting a number of dictionary threads to define aspects of data within the database, wherein the number of dictionary threads is selected independently of selecting the maximum number of worker threads to load the plurality of data chunks.

14. A non-transitory computer-readable storage medium storing thereon executable instructions that, as a result of being executed by one or more processors of a computer system, cause the computer system to at least:
obtain, by a graph database service, a request to load a plurality of data chunks into a graph database instance;
responsive to obtaining the request, dynamically scale up a number of worker threads usable concurrently by the graph database service to load the plurality of data chunks, by:
increasing a maximum number of worker threads for loading the plurality of data chunks, wherein the maximum number of worker threads is selected based on an amount of computing resources assigned to the graph database instance, wherein the amount of computing resources assigned to the graph database instance is adjusted based on pending or predicted operations associated with the graph database instance; and
assigning worker threads from the maximum number of worker threads to load data chunks of the plurality of data chunks into the graph database instance; and
concurrently execute the assigned worker threads to load at least some of the plurality of data chunks into the graph database.

15. The non-transitory computer-readable storage medium of claim 14, wherein the instructions further comprise instructions that, as a result of being executed by the one or more processors, cause the computer system to:
adjust the amount of computing resources assigned to the graph database instance based on a permit system, the permit system allocating computing resources to specific queries against the graph database instance.

16. The non-transitory computer-readable storage medium of claim 14, wherein the instructions further comprise instructions that, as a result of being executed by the one or more processors, cause the computer system to:
track a number of available worker threads relative to the maximum number of worker threads to at least one of reassign a first worker thread of the maximum number of worker threads to load another statement of the plurality of data chunks upon the first worker thread completing loading of a first statement of the plurality of data chunks or assign a new worker thread that has become available based on a change in the maximum number of worker threads; and
assign worker threads from the maximum number of worker threads to load data chunks of the plurality of data chunks into the graph database instance further based on the tracked number of available worker threads.

17. The non-transitory computer-readable storage medium of claim 14, wherein the instructions further comprise instructions that, as a result of being executed by the one or more processors, cause the computer system to:
decrease the number of worker threads usable by the graph database service to load the plurality of data chunks upon detecting a reduction in the number of data chunks of the plurality of data chunks remaining to load below threshold value.

18. The non-transitory computer-readable storage medium of claim 14, wherein dynamically scaling the number of worker threads usable by the graph database service to load the plurality of data chunks is performed asynchronously with loading data chunks of the plurality of data chunks by initialized worker threads.

19. The non-transitory computer-readable storage medium of claim 14, wherein the amount of computing resources assigned to the graph database instance comprises a maximum amount of resources assigned to the graph database instance.

20. The non-transitory computer-readable storage medium of claim 14, wherein the amount of computing resources assigned to the graph database instance comprises a minimum amount of resources assigned to the graph database instance.

* * * * *